TELEVISION GAMMA TEST METHOD AND APPARATUS

Filed Dec. 19, 1949

2 Sheets-Sheet 1

GRAY SCALE ON PICTURE TUBE FOR HORIZONTAL SCANNING FREQ. SAWTOOTH

GRAY SCALE ON PICTURE TUBE FOR VERTICAL SCANNING FREQ. SAWTOOTH

INVENTOR.
RUBERT S. NASLUND
BY
Herman L. Gordon
ATTORNEY

Feb. 2, 1954 R. S. NASLUND 2,668,188

TELEVISION GAMMA TEST METHOD AND APPARATUS

Filed Dec. 19, 1949 2 Sheets-Sheet 2

INVENTOR.
RUBERT S. NASLUND
BY Herman L. Gordon
ATTORNEY

Patented Feb. 2, 1954

2,668,188

UNITED STATES PATENT OFFICE 2,668,188

TELEVISION GAMMA TEST METHOD AND APPARATUS

Rubert S. Naslund, Menomonee Falls, Wis.

Application December 19, 1949, Serial No. 133,830

11 Claims. (Cl. 178—5.4)

This invention relates to electronic test apparatus, and more particularly to methods and means for testing the "gamma," or linearity of light-value reproduction in television and other video equipment.

A main object of the invention is in general to provide a novel and improved technique for testing the degree of visible response of television or other video equipment to various predetermined input signals, and more specifically, to provide a technique for instantaneously testing the linearity of light-value reproduction of a television picture-reproducing system or of other video equipment of a similar nature.

A further object of the invention is to provide an improved method and means for checking the "gamma," or linearity of light-value reproduction in television and other video equipment, the method providing an instantaneous and accurate visual indication of the different degrees of response of the equipment to predetermined levels of signal input, in the form of a pattern which may be readily compared with a standard pattern, whereby valuable information as to the condition and characteristics of the video reproducing equipment may be obtained.

A still further object of the invention is to provide an improved electronic test generator for checking the "gamma," or linearity of light-value reproduction in television and other video equipment, the generator being arranged so that it may be synchronized to the horizontal scanning frequency, whereby a pattern of vertical bars is produced constituting a gray scale shaded in accordance with the linearity of light-value reproduction of the system, or so that it may be synchronized to the vertical scanning frequency, whereby a pattern of horizontal bars is produced constituting another shaded scale showing the linearity or lack of linearity of the light-value response of the system.

A still further object of the invention is to provide an improved method and means for checking the linearity of light-value response in a monochrome video system or for checking the fidelity of color reproduction in a color video system.

A still further object of the invention is to provide an improved step-wave signal generator wherein the phase angles and the voltage magnitudes of the respective voltage steps may be readily and accurately preset, said signal generator being particularly applicable for use in testing electronic image reproducing equipment for linearity of light-value reproduction.

Further objects and advantages of the invention will become apparent from the following description and claims, and from the accompanying drawings, wherein:

Figure 1:
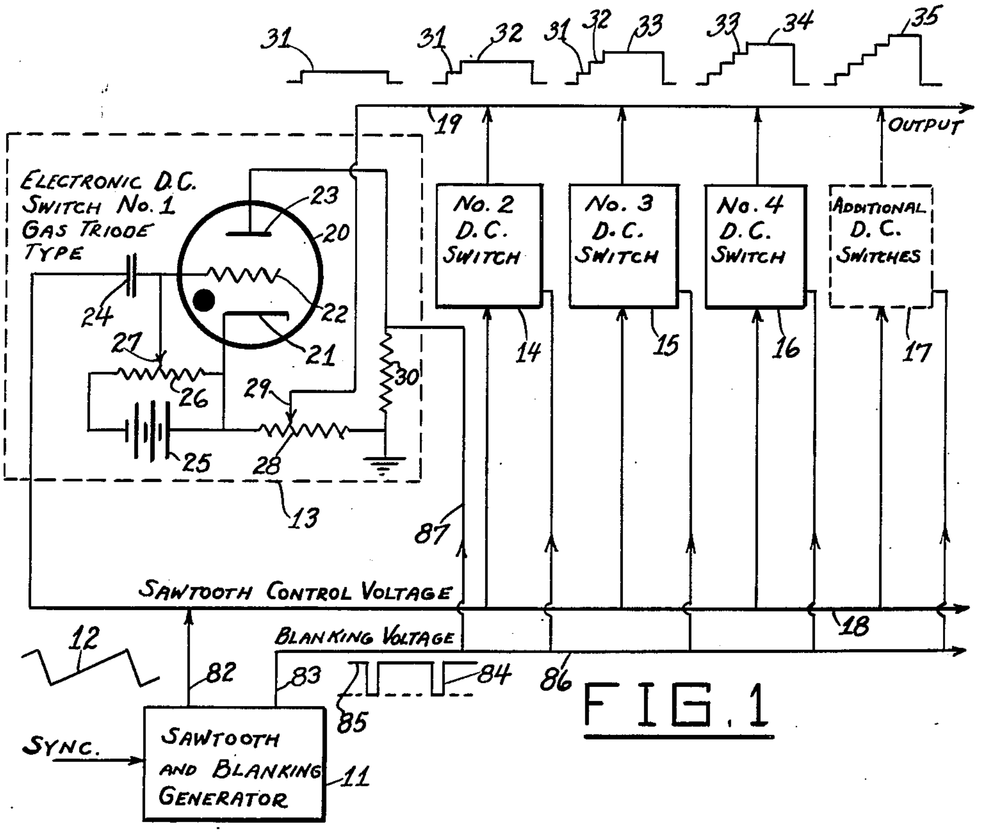
Figure 1 is a schematic block diagram of one form of gamma test generator according to the present invention, showing the electrical components of one of the electronic D. C. switches employed in the test generator.

The method of the present invention is concerned with determining the response of a video reproducing system in terms of degree of brightness, or intensity of light produced on the viewing screen of the system as a function of various constant values of D. C. voltage applied at the input terminals of the system. In order to provide a practical indication on the viewing screen which will show up the linearity, or lack of linearity, of light-value reproduction of the system, the D. C. voltage is applied in such a way as to produce a stationary image on the screen, said image having clearly defined boundaries between the areas representing different values of applied D. C. input voltage. According to a preferred manner of carrying out the method, the D. C. input voltage is applied in discontinuous steps, gradually increasing in value, and producing a pattern comprising a succession of bars on the viewing screen shaded differently in accordance with the value of applied D. C. voltage corresponding thereto.

To produce a stationary pattern on the screen of a video reproducing system, the video signal associated with said pattern must be synchronized with the scanning voltages of the system. Therefore, the applied D. C. test voltages in the present case take the form of stepped waves whose frequency is synchronized with the frequency of at least one of the scanning voltages of the system. It will be seen subsequently that in testing the linearity of light value reproduction of a monochrome video reproducing system, the stepped waves are synchronized with only one of the scanning voltages, i. e., either the horizontal scanning voltage or the vertical scanning voltage. It will be seen further that in testing the linearity of light-value reproduction of a color video reproducing system (wherein primary or other color values are mixed to produce different color values, and hence wherein fidelity of color reproduction depends on the linearity of light-value reproduction of the respective component colors), mixed stepped voltages are applied, certain of the stepped voltages being synchronized with the horizontal scanning frequency of the system and other of the stepped voltages being synchronized with the vertical scanning frequency of the system, whereby a checkerboard pattern of different colors is produced on the viewing screen.

Previous methods of measuring the gamma characteristics of a monochrome television system (see I. G. Maloff, R. C. A. Review, vol. III, 1938-39, page 409) have involved placing a test object made of vertical strips of known reflection coefficients before the Iconoscope camera, measuring the brightness of the object strips, measuring the brightness of the corresponding image strips on the screen of the receiver, and plotting in foot-lamberts the brightness of the image against the brightness of the object on logarithmic coordinates.

The gamma characteristic may be obtained for any television system by the method of the present invention by plotting the brightness of the image strips against the corresponding D. C. step voltages employed to produce the image strips. The present invention therefore eliminates the necessity of measuring object brightness, and permits the ready use of standardized video input step voltages, corresponding to any desired range of object brightness which is to be studied.

Since in monochrome television, in order to avoid photographically flat pictures it is desirable to provide a gamma (or object to image contrast) of between 1.4 and 2 in order to compensate for the lack of color, a convenient and accurate method of testing the gamma characteristic is of great value. Such a method is provided by the present invention. The method of the present invention avoids the use of a television camera in testing the gamma of a video reproducing system and thereby avoids errors due to possible inherent lack of gamma linearity in the camera itself.

Considering first, the method as applied to a monochrome video reproducing system, Figure 1 illustrates in schematic form one embodiment of a step-wave generator which is utilized in accordance with the present invention to produce a stepped wave synchronized with one of the scanning frequencies of a video reproducing system to be tested for linearity of light-value reproduction. Designated at 11 is a sawtooth and blanking generator which is locked in step in a conventional manner with one of the scanning frequencies of the system. The output voltage wave at the terminal 82 of the generator 11 has the conventional sawtooth form shown at 12, each sawtooth being concurrent with a scanning voltage wave. The output voltage wave of the generator 11 at the output terminal 83 has the form shown at 85, each blanking interval thereof, indicated at 84, occurring at the same time as that at which a sawtooth wave 12 drops from its maximum to its minimum value. Designated at 13 is an electronic D. C. switch of the gas triode type. Designated at 14, 15, 16 and 17 are additional electronic D. C. switches similar to switch 13. Said switches are connected in parallel between the output lead of the sawtooth generator 11, indicated at 18, and a common signal output lead, shown at 19.

Each of the electronic switches 13 to 17 comprises a gas triode 20 having a cathode 21, a control grid 22 and a plate 23. The output lead 18 of the sawtooth generator is connected to the grid 22 through a condenser 24. Designated at 25 is a grid biasing battery whose positive terminal is connected to cathode 21. Connected between the negative terminal of battery 25 and cathode 21 is a potentiometer resistor 26 provided with an adjustable tap 27 which is connected to grid 22. The fixed negative bias on grid 22 may therefore be adjusted to a desired value by means of the adjustable potentiometer tap 27. The gas triode is triggered into conduction whenever the voltage bias at tap 27 combined with the sawtooth voltage exceeds the cut-off bias value of the tube. By adjusting the tap 27, the tube 20 may be caused to conduct at any desired point along the ascending portion of the sawtooth wave 12.

Connected between the cathode 21 and ground is a potentiometer resistor 28 having an adjustable tap 29 which is connected to the signal output lead 19. The plate load resistor is shown at 30, one terminal of said load resistor being connected to ground and the other terminal thereof being connected to the plate 23. Plate voltage is furnished to tube 20 by a wire 87 which connects plate 23 to the blanking output voltage lead 86 of generator 11. When the tube 20 is triggered, a constant value of plate current flows through the potentiometer 28, producing a voltage drop, and by adjusting the tap 29, a desired value of step voltage may be applied to the output lead 19. Plate current continues to flow through potentiometer 28 only as long as plate voltage is available at lead 86. Said plate voltage is removed when the blanking interval 84 occurs, thereby interrupting the firing of the tube 20 and restoring control thereof to its grid 22. Since this interruption of plate voltage occurs at the end of the sawtooth wave, the tube 20 does not conduct until it is again triggered.

As shown in Figure 1, the tap 27 of the switch 13 is set to trigger the gas tube 20 thereof early in the sawtooth cycle, and the tap 29 is set to provide a relatively low initial step voltage at lead 19, shown at 31. The tap 27 of the next switch 14 is set to trigger the gas triode of said next switch at a subsequent point on the sawtooth wave 12, and the tap 29 of said next switch 14 is set to provide an increased value of step voltage on the output lead 19, indicated at 32. The adjustable taps of the additional D. C. switches 15, 16, etc., are set to provide successive increased steps of voltage on the output lead 19, as shown at 33, 34, 35, etc. A voltage step may be obtained for each D. C. switch employed.

At the end of each sawtooth wave, the voltage on the grids of the gas triodes drops below the cut-off value, the plate current is reduced to zero, and the signal voltage on output lead 19 returns to its zero value.

Figure 2:
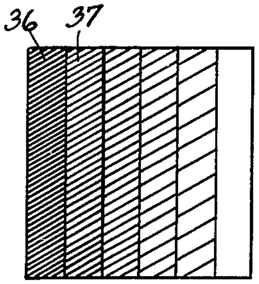
Figure 2 is a view illustrating the appearance of the gray shaded scale obtained on the viewing screen of a video reproducing system when the test generator is synchronized to the horizontal scanning frequency of the system.

When the sawtooth wave generator 11 is synchronized with the horizontal scanning frequency of a video reproducing system and the step wave signal produced at the output lead 19 is applied to the input of the system, a shaded bar pattern such as is illustrated in Figure 2 is produced on the viewing screen of the system. Each of the vertical shaded bars of the pattern is the reproduced light value corresponding to one of the voltage steps of the step wave signal. Thus, the dark bar 36 is produced by the voltage step 31, the lighter bar 37 is produced by the next voltage step 32, and so forth. The control knobs for the adjustable taps 29 may be provided with scales calibrated directly in foot-lamberts of object brightness. By measuring the brightness in foot-lamberts of the image strips 36, 37, etc., the respective image brightness values may be plotted against the respective object brightness values given by the settings of the respective control knobs for the taps 29, whereby the gamma curve of the system may be determined.

Figure 3:
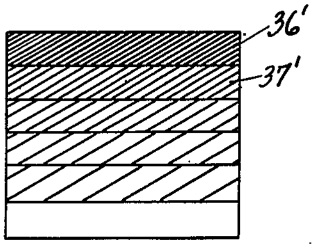
Figure 3 is a view illustrating the appearance of the shaded gray scale obtained on the viewing screen of the reproducing system when the test generator is synchronized to the vertical scanning frequency of the system.

When the sawtooth wave generator 11 is synchronized with the vertical scanning frequency of the system, a shaded bar pattern such as is illustrated in Figure 3 is produced on the viewing screen. As in the pattern of Figure 2, each of the horizontal shaded bars of the pattern is the reproduced light value corresponding to one of the voltage steps of the step wave signal. Thus, the dark bar 36′ is produced by the voltage step 31, the lighter bar 37′ is produced by the voltage step 32, and so forth.

Any number of D. C. switches, one for each shaded bar, may be used. Each switch is adjusted for the desired fraction of the sawtooth cycle during which it operates, for voltage output, and for desired gradation of steps. Thus, the gradation may be adjusted so as to be linear, or so as to have an exponential characteristic.

Figure 4:
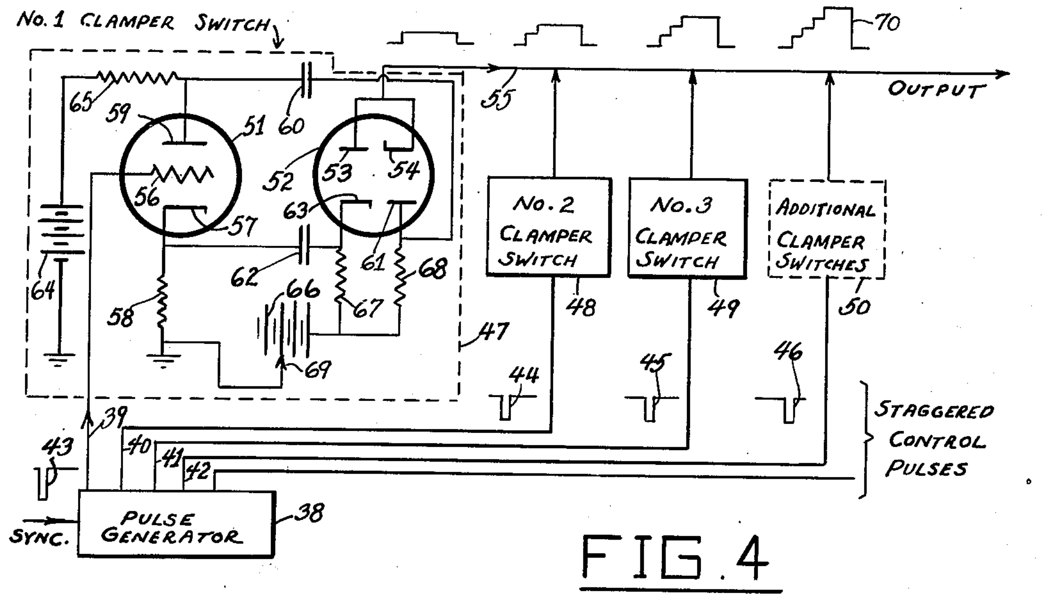
Figure 4 is a schematic block diagram of a different form of gamma test generator which may be employed in accordance with the method of the present invention.

While the combination including the gas triode type of D. C. switches disclosed in Figure 1 represents a preferred embodiment of a suitable gamma test generator according to the present invention, other types of D. C. switch arrangements providing constant D. C. voltage outputs over controlled fractions of the scanning cycles of the video reproducing system may be employed to carry out the novel and improved method of the present invention. More elaborate types of D. C. switches would include the D. C. "clamper" and the "clipper-clamper" combinations. For example, "clamper" types of D. C. switches such as shown in Figure 4 may be employed to provide the successive step voltages of the gamma test generator. This type of D. C. switch is described in the U. S. patent to K. R. Wendt, 2,299,945, issued October 27, 1942.

In Figure 4, 38 designates a pulse generator which is synchronized with either the horizontal or the vertical scanning frequency of the television reproducing system. Pulse generator 38 has respective output leads 39, 40, 41, 42, etc., to which are delivered the respective staggered control pulses 43, 44, 45, 46, etc., from the pulse generator 38, the successive pulses being spaced in accordance with the time spaces between the successive steps of the desired output voltage step wave. There is one control pulse for each step of output voltage.

The respective D. C. "clamper" switches are indicated at 47 to 50. Each "clamper" switch comprises an amplifier triode 51 and a dual diode 52. One plate 53 and one cathode 54 of the dual diode 52 are connected to the output lead 55. A respective output lead from the pulse generator 38 is connected to the grid 56 of each triode 51. The cathode 57 of the triode is connected through a resistor 58 to ground. The plate 59 of the triode is connected through a condenser 60 to a plate 61 of the dual diode. The cathode 57 of the triode is connected through another condenser 62 to the cathode 63 of the dual diode. A battery 64 has its negative terminal grounded and its positive terminal connected through a resistor 65 to the triode plate 59. Designated at 66 is the level-setting battery. Connected between diode cathode 63 and the positive terminal of battery 66 is a cathode resistor 67. Connected between diode plate 61 and said positive terminal is a plate resistor 68. Battery 66 has a variable voltage tap 69 which is connected to ground.

As explained in the Wendt patent, 2,299,945, when a keying pulse is applied to the grid 56 of triode 51, current is caused to flow through the coupling condensers 60 and 62 and the diodes 63—53 and 54—61 through a circuit from plate 59, through condenser 60, through diodes 54—61 and 63—53, and through condenser 62 to cathode 57 of tube 51. Thus the condensers 60 and 62 receive a charge. At the end of the keying pulse the diodes no longer conduct. During the keying pulse the voltage with respect to ground at the output lead 55 is driven to a value determined by the setting of the variable tap 69 of the battery 66.

A further detailed description of the circuit of the clamper switches 47 to 50 will be found in the above mentioned Patent 2,299,945 to K. R. Wendt, or RCA Review, pp. 105–6, March 1946.

It will be apparent that a stepped voltage wave 70 will be available at the output lead 55, the values of the respective voltage steps being established by the settings of the respective adjustable battery taps 69 of the respective clamper switches and the durations of the respective steps being controlled by the durations of the respective keying pulses obtained from the pulse generator 38.

As in the embodiment illustrated in Figure 1, the number of voltage steps (hence, the number of shaded bars obtained on the viewing screen) is determined by the number of clamping switches employed.

Figures 5, 6, 7:
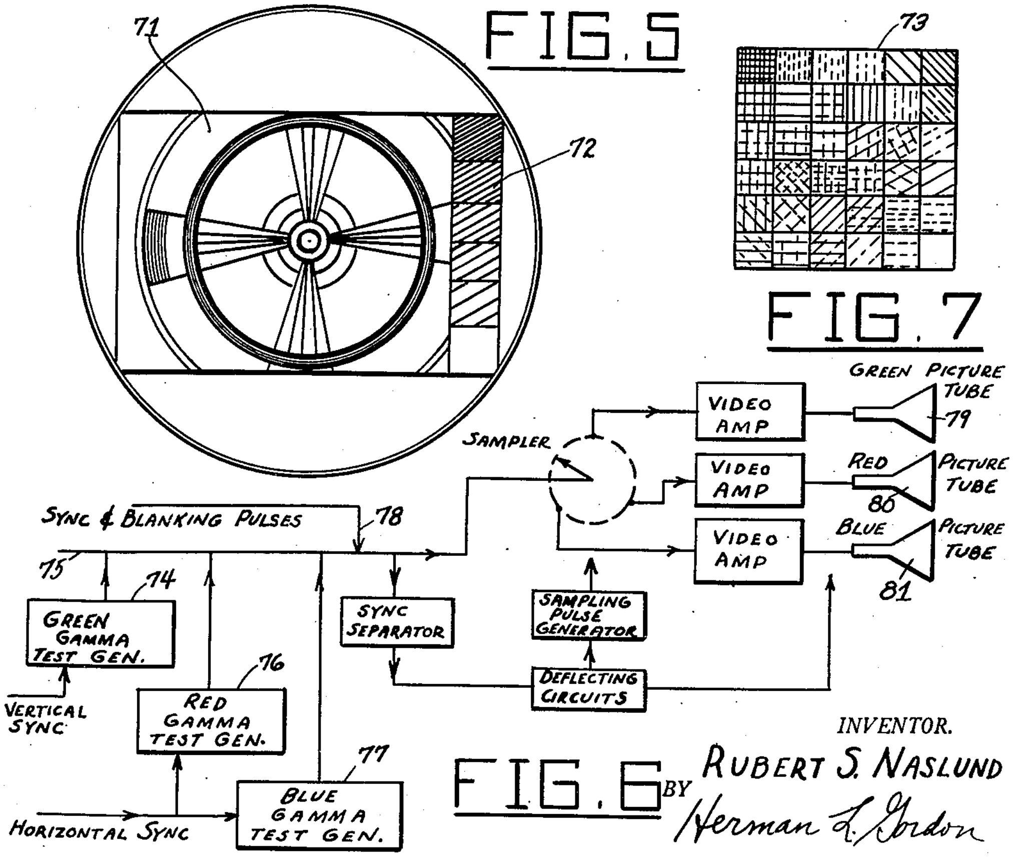
Figure 5 is a view illustrating the imposition of a gamma scale obtained in accordance with the present invention on the viewing screen of a video reproducing system adjacent to a conventional test pattern, whereby information as to the linearity of light-value reproduction of the system may be obtained as well as information as to the other performance characteristics of the system.
Figure 6 is a schematic block diagram illustrating one manner in which the technique of the present invention may be applied to a typical color television reproducing system to obtain information as to the fidelity of color reproduction of the system.
Figure 7 is a view illustrating a color checkerboard pattern which is obtained on the viewing screen of a color video reproducing system by employing the technique of the present invention.

A shaded gray scale obtained by the method of the present invention may be included in test pattern transmission to provide a check on the gamma, or linearity of light-value reproduction, of television receiving equipment. Figure 5 illustrates a typical test pattern 71 accompanied at one side margin by a gamma test bar 72 shaded in gradations of gray and derived in the same manner as the gray scale shown in Figure 3. The gamma test bar 72 is combined with the test pattern 71 by any suitable method, for example, by a method such as is disclosed in the U. S. patent to B. E. Schnitzer, 2,240,420, issued April 29, 1941. The gamma scale may be provided along a vertical side or a horizontal side of the test pattern and adds materially to the utility of the pattern.

In a color video system, a single gamma test generator may be employed to replace a single color component, such as a primary color, and, when the other primaries or component colors are blanked out, the fidelity of color magnitude for the single color replaced may be demonstrated on the viewing screen of the system. Further, by using two or more gamma test generators, each representing a primary color, and by synchronizing one to the vertical (or frame) frequency and the other, or others, to the horizontal (or line) frequency, a checkerboard pattern of all the reproducible colors is derived on the viewing screen, as illustrated at 73 in Figure 7. The gamma generators must precede the normal interlacing-sampling-mixing equipment of the overall transmission system, i. e., must be substituted for the color cameras, so that each generator truly represents only one primary. Because the step waves are adjustable to any desired degree, including zero, all the color mixtures possible are readily obtainable.

Figure 6 illustrates one method of utilizing the above described technique in checking the fidelity of color presentation of a typical system of color reproduction. In Figure 6, the color reproducing system is of the R. C. A. time-multiplex type, described on page 19 of "Tele-Tech," October 1949, published by Caldwell-Clements Inc., New York, N. Y. This system is merely representative of a large number of known color reproducing systems with which the color fidelity test is applicable. As shown, the gamma test generator 74, synchronized to the vertical scanning frequency, feeds the line 75 with step wave signals in place of the green component of a color video signal. The gamma test generators 76 and 77, synchronized to the horizontal scanning frequency, feed the line 75 with step wave signals in place of the red and blue components of a color video signal. Synchronizing and blanking pulses are furnished to the line 75 at 78. The resultant signal is then separated into its color components, providing shaded bar patterns on the picture projection tubes shown at 79, 80 and 81. The composite image obtained on the color blending screen by projecting the bar patterns on the faces of the tubes 79, 80 and 81 through respective green, red and blue filters and combining the patterns is similar to the checkerboard pattern 73 of Figure 7, each square of the pattern being of a different color. The fidelity of color reproduction of the system may be readily determined by comparing the observed checkerboard pattern with a standard colored checkerboard pattern.

While certain specific embodiments of methods and means for testing the linearity of light-value reproduction in television and other video equipment have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A method of determining the image brightness response of a video reproducing system to various signals corresponding to different values of object brightness, said system having a viewing screen and means for scanning said viewing screen at definite frequencies, comprising the steps of generating respective separate direct current pulses having the same pulse frequency but having different lengths, individually adjusting the voltage value of each pulse in accordance with the respective different values of object brightness, and applying the group of pulses simultaneously to the input circuit of the system in synchronism with a scanning frequency of the system, whereby a bar pattern is obtained on the viewing screen of the system, each bar of the pattern having a brightness determined by the response of the system to the associated object brightness value.

2. A method of testing a video reproducing system for linearity of light value reproduction, said system having a viewing screen and means for scanning said viewing screen at definite frequencies, comprising the steps of generating a group of direct current pulses having the same pulse frequency but having different lengths, individually adjusting the voltage value of each pulse in accordance with a predetermined individual value of object brightness, superimposing the pulses to derive a stepped voltage wave, and applying said voltage wave to the input circuit of the system in synchronism with a scanning frequency of the system, whereby a shaded bar pattern is obtained on the viewing screen of the system.

3. A method of testing a video reproducing system for linearity of light value reproduction, said system having a viewing screen and means for scanning said viewing screen at definite frequencies, comprising the steps of generating a group of direct current pulses having the same pulse frequency, terminating in phase with each other, and having different lengths, individually adjusting the voltage value of each pulse in accordance with a predetermined individual value of object brightness, and applying the group of pulses to the input circuit of the system in synchronism with a scanning frequency of the system, whereby a shaded bar pattern is obtained on the viewing screen of the system.

4. A method of testing a video reproducing system for linearity of light value reproduction, said system having a viewing screen and means for scanning said viewing screen at definite frequencies, comprising the steps of generating a group of direct current pulses having the same pulse frequency, individually adjusting the starting time of each pulse in the common pulse cycle, individually adjusting the voltage value of each pulse in accordance with a predetermined individual value of object brightness, terminating the pulses in phase with each other, and applying the group of pulses to the input circuit of the system in synchronism with a scanning frequency of the system, whereby a shaded bar pattern is obtained on the viewing screen of the system.

5. A method of testing a video reproducing system for linearity of light value reproduction, said system having a viewing screen and means for scanning said viewing screen at definite frequencies, comprising the steps of generating a group of direct current pulses having the same pulse frequency, individually adjusting the starting time of each pulse in the common pulse cycle, individually adjusting the voltage value of each pulse in accordance with a predetermined individual value of object brightness, terminating the pulses in phase, superimposing the pulses to derive a stepped voltage wave, and applying said stepped wave to the input circuit of the system in synchronism with a scanning frequency of the system, whereby a shaded bar pattern is obtained on the viewing screen of the system.

6. A method of testing a color video reproducing system for fidelity of color value reproduction, said system having a viewing screen and means for scanning said viewing screen horizontally at one frequency and vertically at another frequency, comprising the steps of generating a group of direct current pulses having the same pulse frequency but having different lengths, individually adjusting the voltage value of each pulse in accordance with a predetermined individual value of brightness of a primary color component of an object, simultaneously applying the group of pulses to the input circuit of the system in synchronism with one of the scanning frequencies of the system, and cyclically applying predetermined different values of D. C. voltage to the input circuit of the system in synchronism with the other scanning frequency of the system, whereby a colored checkerboard pattern is obtained on the viewing screen of the system.

7. A method of testing a color video reproducing system for fidelity of color value reproduction, said system having a viewing screen and means for scanning said viewing screen horizontally at one frequency and vertically at another frequency, comprising the steps of generating a group of direct current pulses having the same pulse frequency but having different lengths, individually adjusting the voltage value of each pulse in accordance with a predetermined individual value of brightness of a primary color component of an object, simultaneously applying the group of pulses to the input circuit of the system in synchronism with one of the scanning frequencies of the system, and cyclically applying stepped voltage waves to the input circuit of the system in synchronism with the other scanning frequency of the system, whereby a colored checkerboard pattern is obtained on the viewing screen of the system.

8. A method of testing a color video system for fidelity of color value reproduction, said system having a viewing screen and means for scanning said viewing screen horizontally at one frequency and vertically at another frequency, comprising the steps of generating a group of direct current pulses having the same pulse frequency but having different lengths, individually adjusting the voltage values of each pulse in accordance with a predetermined individual value of brightness of a primary color component of an object, simultaneously applying the group of pulses to the input circuit of the system in synchronism with one of the scanning frequencies of the system in place of one of the object primary color input signals, and cyclically applying stepped voltage waves to the input circuit of the system in synchronism with the other scanning frequency of the system in place of the other primary color input signals, whereby a colored checkerboard pattern is obtained on the viewing screen of the system.

9. A method of determining the image brightness response of a video reproducing system to a series of signals increasing in strength corresponding to a series of object brightness values similarly increasing in magnitude, said system having a viewing screen and means for scanning said viewing screen at definite frequencies, comprising the steps of generating respective separate direct current pulses having the same pulse frequency but having successively increased lengths, individually adjusting the voltage value of each pulse in accordance with the respective different values of object brightness, superimposing the pulses so that they terminate in phase, and applying the superimposed pulses to the input circuit of the system in synchronism with a scanning frequency of the system, whereby a stepped bar pattern is obtained on the viewing screen of the system, each bar of the pattern having a brightness determined by the response of the system to the associated object brightness value.

10. A method of testing a video reproducing system for linearity of light value reproduction, said system having a viewing screen and means for scanning said viewing screen at definite frequencies, comprising the steps of generating a sawtooth voltage wave, generating a group of direct current pulses of different durations but terminating in phase and having the same frequency as said wave, said pulses having respective different voltage values in accordance with selected voltage values along said wave, corresponding to predetermined individual values of object brightness, superimposing the pulses to derive a stepped voltage wave, and applying said stepped voltage wave to the input circuit of the system in synchronism with a scanning frequency of the system, whereby a shaded bar pattern is obtained on the viewing screen of the system.

11. A method of testing a color video reproducing system for fidelity of color value reproduction, said system having a viewing screen and means for scanning said viewing screen at definite frequencies, comprising the steps of generating a sawtooth voltage wave, generating a group of direct current pulses of different durations but terminating in phase and having the same frequency as said wave, said pulses having respective different voltage values in accordance with selected voltage values along said wave, corresponding to predetermined individual values of brightness of a primary color component of an object, superimposing the pulses to derive a stepped voltage wave, applying said stepped voltage wave to the input circuit of the system in synchronism with a scanning frequency of the system, and cyclically applying predetermined different values of D. C. voltage to the input circuit of the system in synchronism with the other scanning frequency of the system, whereby a colored checkerboard pattern is obtained on the viewing screen of the system.

RUBERT S. NASLUND.

References Cited in the file of this patent

UNITED STATES PATENTS

| Number | Name | Date |
|---|---|---|
| 1,706,538 | Mertz | Mar. 26, 1929 |
| 2,247,512 | Lewis | July 1, 1941 |
| 2,250,819 | Wolf | July 29, 1941 |
| 2,352,488 | Mayle | June 27, 1944 |
| 2,465,355 | Cook | Mar. 29, 1949 |
| 2,487,191 | Smith | Nov. 8, 1949 |
| 2,552,588 | Reeves | May 15, 1951 |
| 2,580,083 | Doba et al. | Dec. 25, 1951 |

FOREIGN PATENTS

| Number | Country | Date |
|---|---|---|
| 65,540 | Denmark | Aug. 25, 1947 |
| 620,132 | Great Britain | Mar. 21, 1949 |

OTHER REFERENCES

"Tele-Tech," April 1949, "Pulse Cross Generator Applied to TV Production Test Equipment," pp. 36–37.